(12) United States Patent
Konno et al.

(10) Patent No.: US 7,473,469 B2
(45) Date of Patent: Jan. 6, 2009

(54) FERROMAGNETIC POWDER FOR A MAGNETIC RECORDING MEDIUM, METHOD OF PRODUCING THE POWDER, AND MAGNETIC RECORDING MEDIUM USING THE POWDER

(75) Inventors: Shinichi Konno, Honjo (JP); Kenichi Inoue, Hirosaki (JP); Toshihiko Ueyama, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 201 days.

(21) Appl. No.: 11/315,208

(22) Filed: Dec. 23, 2005

(65) Prior Publication Data

US 2007/0148501 A1 Jun. 28, 2007

(51) Int. Cl.
*B32B 5/66* (2006.01)
(52) U.S. Cl. .................. 428/403; 428/404; 428/694 BA; 427/128
(58) Field of Classification Search .................. 428/403, 428/694 BA, 404; 427/128
See application file for complete search history.

(56) References Cited

U.S. PATENT DOCUMENTS 6,939,575 B2 * 9/2005 Aonuma ..................... 427/127

FOREIGN PATENT DOCUMENTS

| JP | 61-154112 | 7/1986 |
|---|---|---|
| JP | 2-46642 | 10/1990 |
| JP | 3-169001 | 7/1991 |
| JP | 4-230004 | 8/1992 |
| JP | 6-213560 | 8/1994 |
| JP | 10-17901 | 1/1998 |

\* cited by examiner

*Primary Examiner*—Kiliman Leszek
(74) *Attorney, Agent, or Firm*—Clark & Brody

(57) ABSTRACT

A ferromagnetic metal powder for a magnetic recording medium that combines good magnetic properties and oxidation stability, and a magnetic recording medium using the powder. A method of producing the magnetic powder comprises using oxygen to form an oxide film, then changing the state of the oxide film by using moderate gas phase activation treatment in an active gas, using, for example, CO or $H_2$ or other such gas having reducing properties. ESCA-based measurements show that the binding energy peak of the powder is more to the low energy side compared to when the above treatment is not used, showing that the oxide film has oxidation resistance. The storage stability of a magnetic recording medium is improved by using the powder.

6 Claims, 1 Drawing Sheet

FERROMAGNETIC POWDER FOR A MAGNETIC RECORDING MEDIUM, METHOD OF PRODUCING THE POWDER, AND MAGNETIC RECORDING MEDIUM USING THE POWDER

FIELD OF THE INVENTION

The present invention relates to a ferromagnetic powder with good oxidation resistance for use in a magnetic recording medium.

DESCRIPTION OF THE PRIOR ART

In recent years, there have been extensive studies aimed at improving the density and image quality magnetic recording media, such as tape used in home audio-visual equipment and storage tape for data backup applications.

A specific example of an application that is being studied is data storage tape for computers. There is a constant endeavor to increase the capacity of such storage, which means writing more information into small recording regions. To enable higher densities, it is necessary for the particles of metallic system ferromagnetic powder used to constitute the tape to be made ever smaller.

One of the biggest problems with this size refinement of the metallic system ferromagnetic particles relates to the oxidation stability of the particles. As has been extensively documented, when the particles having poor oxidation stability are used in a magnetic recording medium, it has a markedly adverse effect on the ability of the medium to retain the stored data. Therefore, research is endeavoring to find ways to improve the oxidation stability of the magnetic particles.

Examples that can be cited include a method of using weakly acidic gas or oxygen gas to oxidize the particles in an inert gas, such as that described by JP 04-230004A (Reference No. 1); a method in which reduction is followed by oxidation treatment and annealing in an inert atmosphere, such as that described by JP 10-017901A (Reference No. 2); heating the particles at 100 to 500° C. in an inert gas, such as is described by JP S61-154112A (Reference No. 3); a method in which, following oxidation treatment, the particles are again oxidized by annealing in an inert gas for 5 to 24 hours at a temperature of 80 to 600° C., such as that described by JP 02-046642 B (Reference No. 4); and a method in which mild oxidation treatment is performed, using a fluidized bed, which is followed by heat treatment at 150 to 600 ° C. for 0.2 to 24 hours in an inert gas, and then by another oxidation treatment, such as that described by JP 03-169001A (Reference No. 5).

Particle surface related studies also include using Electron Spectroscopy for Chemical Analysis (ESCA) to define components, such as in JP 06-213560 A (Reference No. 6); that surface components can play an important role in improving oxidation resistance is widely known as a condition for this. However, as shown by the extensive studies relating to improving oxidation resistance as particle size is decreased, the technology for this has yet to be established.

OBJECT OF THE INVENTION

Thus, since the inventions of the prior art do not completely resolve the problems relating to oxidation resistance, further improvements are sought. The object of the present invention is, therefore, to provide a metallic system magnetic powder for a magnetic recording medium that has good oxidation stability.

SUMMARY OF THE INVENTION

To resolve the technical problems described in the above, the present inventors conducted various investigations on how to improve oxidation resistance while at the same time maintaining magnetic properties, of ferromagnetic metal powder of acicular particles comprised primarily of iron and other additive elements. What the inventors came to focus on was how to handle or treat the powder after reduction.

Specifically, after using oxygen to form an oxide film following the reduction process, the state of the oxide film was changed by using moderate gas phase activation treatment in an active gas, using, for example, CO or $H_2$ or other such gas having reducing properties.

Using ESCA-based measurements, the point at which the binding energy peak appears was more to the low energy side compared to when the above treatment was not used, showing that the oxide film obtained had a different structure than that of an oxide film obtained using a conventional method. The structure of the obtained oxide film cannot be definitively identified, but it can be presumed to have undergone a change to a substance that is not readily oxidized.

The ferromagnetic powder provided by this method is ideal, since it enables the elimination of factors having an adverse effect on the magnetic properties that are present in the conventional technology that uses the addition of different metals and the like.

In accordance with this invention, the above object is attained by a ferromagnetic metal powder of acicular particles comprised primarily of iron for a magnetic recording medium characterized in that the powder has an ESCA-measured binding energy peak of from 525 to 532 electron volts (eV). The acicular particles have a long axis length of not more than 100 nm, preferably less than 80 nm, more preferably not more than 60 nm. The object is also attained by said ferromagnetic powder for a magnetic recording medium that, after being stored for one week at a constant temperature of 60° C. and a constant relative humidity of 90%, exhibits a saturation magnetization percentage decrease $\Delta\sigma s$ of less than 15% (here, taking $\sigma s(i)$ as the saturation magnetization prior to being stored at a constant temperature and constant humidity and $\sigma s(ii)$ as the saturation magnetization after said one week, $\Delta Hc=100\times(\sigma s(i)-\sigma s(ii))/\sigma s(i)$.

The invention also comprises the above ferromagnetic powder having a Co content in terms of Co/Fe atomic percentage ratio of not more than 50%, an Al content in terms of Al/Fe atomic percentage ratio of not more than 50%, and/or rare earth element including Y (expressed as R) content in terms of R/(Fe+Co) atomic percentage ratio of not more than 25%. The surface of the ferromagnetic powder particles can have an iron system oxide. The above object is also attained by a ferromagnetic powder for a magnetic recording medium obtained by subjecting metallic iron powder obtained by reduction to oxidation treatment, reducing the surface of the powder particles in a reducing gas, and subjecting the powder particles to another oxidation treatment. The above object is also attained by a method of producing the magnetic powder for a magnetic recording medium, comprising using reduction treatment to obtain metallic iron powder, subjecting the powder to oxidation treatment, reducing the surface of the powder particles in a reducing gas, and subjecting the powder particles to another oxidation treatment. The material reduced by the method of producing the powder may be iron oxyhydroxide or α-iron oxide. The above object is also obtained by a magnetic recording medium that uses the ferromagnetic powder to constitute the magnetic layer.

The ferromagnetic powder for a magnetic recording medium according to this invention has a small Δσs of less than 15%, markedly improving its oxidation resistance.

DETAILED DESCRIPTION OF THE INVENTION

Figure 1:
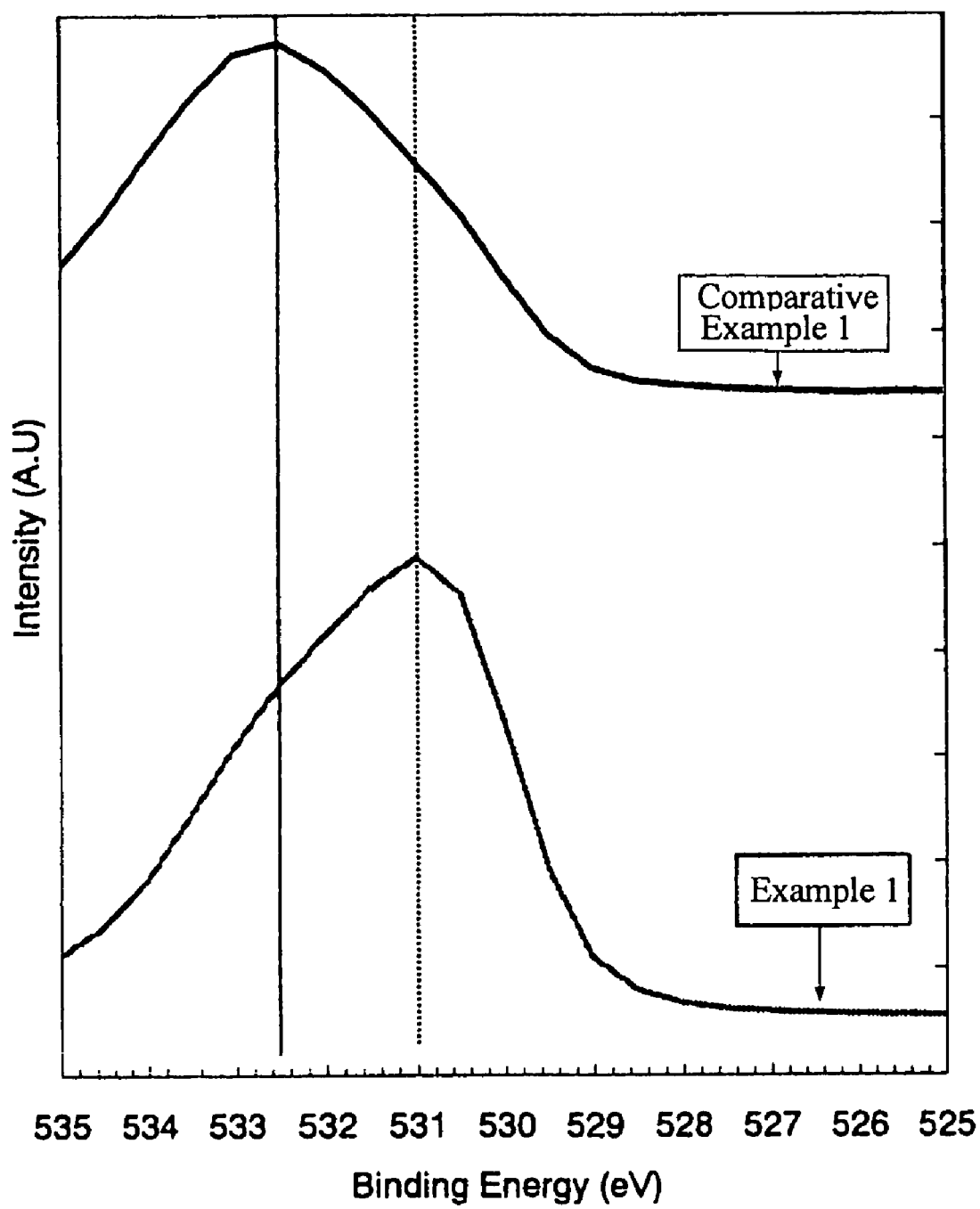
FIG. 1 is a graph showing binding energy peaks of Example 1 and Comparative Example 1, measured using ESCA.

The oxide film of the ferromagnetic metal powder particles of this invention has a binding energy peak, measured using Electronic Spectroscopy for Chemical Analysis (ESCA), in a relatively lower energy range. Specifically, it appears in the range of from 525 to 532 electron volts (eV), and more preferably in the range of from 525 to 531 eV. In the case of a conventional oxide film having lower oxidation stability than those of the present invention, the peak is at around 533 eV, so the particles have a different oxygen binding state.

There is no particular limitation on the shape or form of the ferromagnetic powder particles, which may have the same shape as that of ordinary metallic system magnetic powder, such as, for example, acicular, spindle-shaped, flat-acicular-shaped, granular, rod-shaped, or elliptical.

Examples of methods that can be used to prepare the magnetic powder of this invention include reducing iron oxyhydroxide particles to form metallic iron magnetic particles, and using a reducing agent to reduce metal ions in solution to obtain metallic iron powder. The method described herein is the one using that produces metallic iron magnetic particles from iron oxyhydroxide particles, which currently is the most widely used method.

First, the iron oxyhydroxide constituting the starting material is formed. Methods that can be used to produce the iron oxyhydroxide include forming iron carbide by adding an aqueous solution of ferrous salt to an aqueous carbonate solution (a caustic alkali may also be added), adding an oxygen-containing gas to produce particle nuclei, and growing them to form the iron oxyhydroxide, or adding a caustic alkali to an aqueous solution of ferrous salt and using the reaction to form the iron oxyhydroxide. The invention imposes no particular limitation on the shape of the iron oxyhydroxide particles or the method of producing them.

The magnetic particles precursors may have a composition that contains cobalt, or have an outer surface covered by a cobalt compound. If cobalt is included in the iron oxyhydroxide composition, it can be combined before adding the carbonate or added during the oxidation reaction. When a cobalt compound is to be used to cover the surface of the particles, it can be done by adding the cobalt in the form of a compound with ethylene diamine tetraacetic acid (EDTA) after the reaction has been completed, or the cobalt can be added in the form of hydrated ions after suitably adjusting the pH of the reactive solution.

In terms of Co/Fe atomic percentage ratio, the amount of cobalt added is from 0 to 50%, preferably 0 to 40%, and more preferably 0 to 35%. The amount added is selected to provide the best ratio, based on factors such as coercive force, saturation magnetization, oxidation stability, and so forth. The Co/Fe ratio should not exceed 50%, since that would degrade the balance of properties with respect to saturation magnetization per unit volume and oxidation resistance.

It is desirable to add aluminum to the magnetic particles to improve their wear resistance, impart an appropriate hardness, prevent sintering and improve dispersibility in the binder. The amount of added aluminum, in terms of the Al/(Fe+Co) atomic percentage ratio, is 0 to 50%, preferably 1 to 30%, and more preferably 2 to 15%. Adding more than 50% aluminum is undesirable since the particles become too hard, increasing their abrasiveness and producing a marked decrease in the saturation magnetization. Aluminum is not added at the initial stage of particle nucleus formation. If that is not observed, the particles do not maintain their acicularity, making it impossible to obtain adequate magnetic properties that come from shape magnetic anisotropy of particles. A suitable time to add the aluminum is from during the growth phase when the shape of the particles is forming to some extent, to directly before the completion of the oxidation.

Rare earth elements also need to be added to the magnetic particles. Adding rare earth elements help the particles retain their shape, prevent sintering, and improve the particle size distribution. The amount of added rare earth elements (including Y) R, in terms of the R/(Fe+Co) atomic percentage ratio, is 0 to 25%, preferably 1 to 20%, and more preferably 2 to 15%. Adding more than 25% rare earth elements is undesirable, since it produces a marked decrease in magnetic properties. The rare earth elements can be added during the iron oxyhydroxide growth phase, or after growth is completed.

In addition to components that have to be added for the process of producing the magnetic particles, it is also necessary to add components for the magnetic properties and to improve the dispersibility of the particles in the binder.

The iron oxyhydroxide containing cobalt thus obtained by the above process is filtered, washed and dried by the usual methods. The drying is done at a temperature of 80 to 300° C., preferably 100 to 250° C., and more preferably 120 to 220° C. Drying at more than 300° C. is undesirable since it causes non-uniformity of the hematite formation, while a drying temperature that is below 80° C. does not remove enough of the water content, which can give rise to non-uniform reduction.

A usual method can be used to convert the dried one thus obtained from iron oxyhydroxide to an iron oxide such as α-hematite. Methods that maintain the particles in such a case include placing the particles in a bucket through which gas can be passed and passing $N_2$ gas therethrough while converting the particles, or placing the particles in a rotating furnace that is rotated while converting the particles; either of these methods may be used. The calcination is done at a temperature of 250 to 750° C., preferably 300 to 600° C., and more preferably 350 to 550° C. The calcination atmosphere should contain no steam or carbonic acid gas. A drying temperature that is lower than 250° C. is not suitable, since it can give rise to non-uniform phase transformation to the α-iron oxide (hematite). A calcination temperature that exceeds 750° C. is also undesirable, since it can cause sintering of the particles.

The iron oxyhydroxide or iron oxide system particles can be subjected to gas-phase reduction. Reducing gases that can be used include carbon monoxide, hydrogen, and acetylene. A multistage reduction method can be used in which the temperature is changed from a first-stage temperature to a second-stage temperature. In this multistage reduction, a relatively low temperature is maintained during the first-stage reduction, and the temperature is then elevated to a relatively high temperature that is maintained for the second-stage reduction. Here, the low-temperature reduction takes place at 300 to 600° C., preferably 300 to 550° C.; and the high-temperature reduction takes place at 350 to 700° C., preferably 350 to 650° C.

The magnetic metallic particles thus obtained are highly active, so it is necessary to form a stabilizing oxide film on the particle surface. The oxide film is formed in atmosphere containing oxygen at a temperature that is not higher than 200° C., preferably not higher than 180° C., and more preferably not higher than 150° C. It is possible to form an oxide film at over 200° C., but it is not desirable, because the film thus formed is too thick.

Next, the atmosphere in the furnace is changed to an active gas such as a gas like CO or $H_2$ having reducing properties, which is used to subject the particles to mild gas-phase activation treatment to change the state of the oxide film. An oxygen-containing gas is then again introduced to effect further formation of the oxide film. It is undesirable to use a gas-phase activation (annealing) temperature that is below 100° C., since that will reduce the oxide film improvement effect of the annealing treatment, reducing the $\Delta\sigma s$ improvement effect. On the other hand, it is undesirable for the temperature to exceed 500° C., since that would reduce the effect of the annealing treatment, reducing the $\Delta\sigma s$ improvement effect. Therefore, the temperature range for the annealing is set at 100 to 500° C., preferably 150 to 450° C., and more preferably 200 to 400° C.

EXAMPLES

The composition and magnetic properties of the material obtained in accordance with this invention were analyzed as follows.

Composition Analysis

In surface analyses, extensive use is made of ESCA and Auger Electron Spectroscopy (AES). The results shown in the case of this invention were obtained using ESCA-based measurements. Measurement were conducted using an ESCA-5800 manufactured by Ulvac-Phi, Incorporated, with the take-off angle set at 45 degrees and samples placed in a holder. The scanning speed was 5 eV/min, etching took place at 2 nm/cycle, and the particle surface composition was calculated based on the readings from 10 cycles (i.e., 20 nm). The point at which oxygen O(1S) appeared was measured within a measurement range of 525 to 545 eV.

The amounts of Co, Al and R (actually Y) were determined using an Iris/AP Inductively Coupled Plasma Spectrometer manufactured by Jarrell Ash Japan, and the amount of Fe was determined using a COMTIME-980 Hiranuma Automatic Titrator manufactured by Hiranuma Sangyo Co., Ltd. These determinations were in weight percentages, which were converted to atomic percentages during the calculations.

Length of Long and Short Particle Axes

A transmission electron micrograph showing a ×174,000 magnification of the field of view of the transmission electron microscope was used to measure the long and short axes of 500 particles, and the measured values were averaged. Particles that were not clearly defined due to overlapping or which were partly cut off by the border of the micrograph were not included; only single, well-distributed particles were measured.

Evaluation of Magnetic Properties and Oxidation Resistance

A model VSM-7P vibrating sample magnetometer (VSM), manufactured by Toei Kogyo Co., Ltd., was used to measure magnetic properties in an externally applied magnetic field of 10 kOe (796 kA/m).

Oxidation resistance was measured by storing the particles for one week at a constant temperature of 60° C. and a constant relative humidity of 90% and then calculating the percentage by which the saturation magnetization decreased during storage, using the equation $$\Delta\sigma s = 100 \times ((\sigma s(i) - \sigma s(ii))/\sigma s(i)$$

in which $\sigma s(i)$ is the saturation magnetization measured prior to storage, $\sigma s(ii)$ is the saturation magnetization measured after storage, and $\Delta\sigma s$ is the percentage decrease in saturation magnetization during storage.

Storage stability of the medium was measured by manufacturing tape using the particles, storing the tape samples for one week at a constant temperature of 60° C. and a constant relative humidity of 90%, and then calculating the percentage by which the maximum magnetic flux density Bm decreased during storage, using the equation $$\Delta Bm = 100 \times ((Bm(i) - Bm(ii))/Bm(i)$$

in which Bm(i) is the maximum magnetic flux density measured prior to storage, Bm(ii) is the maximum magnetic flux density measured after storage, and $\Delta Bm$ is the percentage decrease in the maximum magnetic flux density during storage.

Tape Evaluation

To evaluate the tape, 100 parts by weight of ferromagnetic iron alloy powder were blended with the materials set out below in the indicated number of parts by weight, and the blend was distributed for one hour in a ball mill, to prepare the magnetic coating material. An applicator was used to apply the magnetic coating material onto a base film of polyethylene terephthalate to form magnetic tape. The coercive force Hcx of the tape was measured, and the hysteresis loop thereof was used to calculate the Switching Field Distribution (SFDx) of the medium.

Ferromagnetic iron alloy powder 100 parts by weight
Polyurethane resin (UR8200 made by Toyobo) 30 parts by weight
Methyl ethylene ketone 190 parts by weight
Cyclohexanone 80 parts by weight
Toluene 110 parts by weight
Stearic acid 1 part by weight
Acetylacetone 1 part by weight
Alumina 3 parts by weight
Carbon black 2 parts by weight Specific Surface Area Calculated by the BET method, using a 4-Sorb US manufactured by Yuasa Ionics Inc.

Dx (Crystallite Size) Measurement

A model RAD-2C X-ray diffractometer manufactured by Rigaku Denki Co., Ltd. was used to obtain the half-value width of the refraction peak of the Fe (110) surface, and the 2θ was used to obtain the Dx in accordance with D(110)=Kλ/β cos θ (wherein K is Sierra constant 0.9, λ is X-ray radiation wavelength, β is half-width value of the refraction peak (corrected to radian-diameter), and θ is angle of refraction).

Example 1

A particle cake was prepared comprised primarily of iron oxyhydroxide produced, via carbonate, from a mixed solution of ferrous salt and cobalt salt. The particles of the cake had a long axis of 0.062 μm, an axial ratio of 8.5, a BET value of 129.7 $m^2$/g, a Co/Fe atomic percentage ratio of 20.3%, an Al/(Fe+Co) atomic percentage ratio of 8.7%, and an Y/(Fe+Co) atomic percentage ratio of 6.0%, as shown in Table 1 as Material A. The cake was then dried at 130° C. to obtain dry solid iron oxyhydroxide. 7.6 g of this solid material was placed in a bucket and calcinated in air at 350° C. while adding an amount of water vapor at a flow rate corresponding to 10 percent by volume (1.13 L/min·cm$^2$) of the total gas flow, to thereby obtain iron system oxide composed primarily of α-hematite.

TABLE 1

| | Properties of acicular crystal iron oxyhydroxide | | | | | |
|---|---|---|---|---|---|---|
| | | | | Particle properties | | |
| Starting | Composition | | | Long | | |
| material FeOOH | Co/Fe (at. %) | Al/(Fe + Co) (at. %) | Y/(Fe + Co) (at. %) | axis (μm) | Axial ratio | BET (m$^2$/g) |
| Material A | 20.3 | 8.7 | 6.0 | 0.062 | 8.5 | 129.7 |
| Material B | 15.8 | 9.3 | 6.4 | 0.048 | 4.7 | 145.8 |
| Material C | 20.9 | 8.9 | 5.8 | 0.043 | 3.9 | 153.7 |
| Material D | 30.6 | 8.7 | 4.8 | 0.079 | 7.3 | 128.5 |

The α-hematite composed primarily of iron oxide thus obtained was put into a bucket through which gas can pass, and the bucket was placed in a flow-through reducing furnace, where it was reduced by heating it at 400° C. for 5 minutes in a flow of hydrogen gas (11.32 L/min·cm$^2$) while adding an amount of water vapor at a flow rate corresponding to 10 percent by volume (1.13 L/min·cm$^2$) of the total gas flow. After the end of the reduction period, the supply of water vapor was stopped, and the temperature in the hydrogen atmosphere was raised to 600° C. at a temperature elevation rate of 10° C./min. Following this, water vapor was again added at a flow rate corresponding to 10 percent by volume (1.13 L/min·cm$^2$) of the total gas flow while high-temperature reduction treatment was carried out for 10 minutes, to thereby obtain reduced iron alloy powder.

The atmosphere in the furnace was then changed from hydrogen to nitrogen with a flow rate of 19.66 L/min·cm$^2$, and the temperature reduced to 90° C. at a temperature fall rate of 20° C./min. Next, at the initial phase of oxide film formation, a gas comprising a mixture of 16.90 L/min·cm$^2$ nitrogen and 0.08 L/min·cm$^2$ air was added into the furnace and water vapor was added at a flow rate corresponding to 10 percent by volume (1.70 L/min·cm$^2$) of the total gas flow, while forming the oxide film in the atmosphere thus composed of the mixture of water vapor, air and nitrogen. At the point at which heat was generated by the surface oxidation, the flow rate of the air was gradually increased to elevate the concentration of oxygen in the furnace atmosphere. The final flow rate of the air was 0.78 L/min·cm$^2$. The total amount of gas flowing through the furnace was kept constant by adjusting the total amount of air introduced into the furnace to thereby adjust the amount of nitrogen.

The temperature was then elevated at 10° C./min to 350° C. in a nitrogen atmosphere, and reduction (called annealing treatment or process) carried out for 30 minutes in a flow of hydrogen gas (11.32 L/min·cm$^2$) while adding water vapor at a flow rate corresponding to 10 percent by volume (1.13 L/min·cm$^2$) of the total gas flow.

Next, the atmosphere in the furnace was again switched from hydrogen to nitrogen, and after stop of water vapor flow, the internal temperature of the furnace was lowered to 80° C. A gas comprising a mixture of 16.90 L/min·cm$^2$ nitrogen and 0.08 l/min·cm$^2$ air was then added into the furnace and water vapor was added at a flow rate corresponding to 10 percent by volume (1.70 L/min·cm$_2$) of the total gas flow, while forming the oxide film in the atmosphere thus composed of the mixture of water vapor, air and nitrogen. Ten minutes after the start of this, the flow rate of the air was raised to 0.16 L/min·cm$^2$, and after 20 minutes was raised to 0.78 L/min·cm$^2$. This state was maintained for 10 minutes to thereby obtain metallic magnetic powder. Magnetic powder having an improved oxide film was obtained by using the total amount of air introduced into the furnace to thereby adjust the nitrogen flow.

Table 2 shows the magnetic properties of the magnetic powder thus obtained, and the evaluation properties of tape using the powder. FIG. 1 shows the binding energy peak of the powder. As shown, the powder had a binding energy peak of 531.0 eV and a low Δσs of 8.2%, and the tape using the powder also had a low ΔBm of 2.4%. Thus, both powder and tape exhibited good oxidation resistance.

TABLE 2

| | | | | | | Ferromagnetic Powder Properties | | | | |
|---|---|---|---|---|---|---|---|---|---|---|
| | | | | | | | | | Powder Properties | |
| | Starting | Material | | | | Composition | | | Long | |
| | Material | to be | Annealing Process | | | Co/Fe | Al/(Fe − Co) | Y/(Fe + Co) | Axis | Axial |
| No. | FeOOH | reduced | Gas | Temp. | Time | (at. %) | (at. %) | (at. %) | (μm) | Ratio |
| Example 1 | Material A | α-Fe$_2$O$_3$ | Hydrogen | 350 | 30 | 20.4 | 8.9 | 6.1 | 0.048 | 5.4 |
| Example 2 | Material B | α-Fe$_2$O$_3$ | Hydrogen | 350 | 30 | 15.5 | 9.4 | 6.2 | 0.037 | 4.7 |
| Example 3 | Material C | α-Fe$_2$O$_3$ | Hydrogen | 350 | 30 | 20.8 | 9.1 | 5.9 | 0.032 | 3.9 |
| Example 4 | Material D | α-Fe$_2$O$_3$ | Hydrogen | 350 | 30 | 30.4 | 8.7 | 4.9 | 0.054 | 7.2 |
| Example 5 | Material A | α-FeOOH | Hydrogen | 350 | 30 | 20.8 | 8.6 | 5.9 | 0.047 | 5.8 |
| Example 6 | Material B | α-FeOOH | Hydrogen | 350 | 30 | 15.4 | 9.2 | 6.0 | 0.034 | 5.7 |
| Example 7 | Material C | α-FeOOH | Hydrogen | 350 | 30 | 20.4 | 9.3 | 6.2 | 0.027 | 4.3 |
| Example 8 | Material D | α-FeOOH | Hydrogen | 350 | 30 | 29.8 | 8.4 | 4.7 | 0.039 | 5.7 |
| Example 9 | Material A | α-Fe$_2$O$_3$ | Hydrogen | 200 | 30 | 20.5 | 8.8 | 6.2 | 0.046 | 6.2 |
| Example 10 | Material A | α-Fe$_2$O$_3$ | Hydrogen | 300 | 30 | 20.4 | 8.7 | 6.0 | 0.045 | 5.9 |
| Example 11 | Material A | α-Fe$_2$O$_3$ | Hydrogen | 400 | 30 | 20.6 | 8.7 | 6.1 | 0.047 | 5.8 |
| Example 12 | Material A | α-Fe$_2$O$_3$ | Hydrogen | 600 | 30 | 20.2 | 8.8 | 6.2 | 0.049 | 6.0 |
| Example 13 | Material A | α-Fe$_2$O$_3$ | Hydrogen | 350 | 10 | 20.5 | 8.9 | 6.1 | 0.047 | 6.1 |
| Example 14 | Material A | α-Fe$_2$O$_3$ | Hydrogen | 350 | 20 | 20.3 | 8.9 | 5.9 | 0.048 | 6.3 |

TABLE 2-continued

| | | | | | | | | | | |
|---|---|---|---|---|---|---|---|---|---|---|
| Example 15 | Material A | α-Fe₂O₃ | Hydrogen | 350 | 40 | 20.4 | 8.7 | 6.0 | 0.047 | 6.0 |
| Example 16 | Material A | α-Fe₂O₃ | Hydrogen | 350 | 60 | 20.5 | 8.9 | 6.2 | 0.049 | 5.9 |
| Example 17 | Material A | α-Fe₂O₃ | Carbon Monoxide | 350 | 30 | 20.8 | 9.1 | 6.2 | 0.047 | 5.8 |
| Example 18 | Material A | α-Fe₂O₃ | Acetylene | 350 | 30 | 20.4 | 9.0 | 6.1 | 0.045 | 5.9 |
| Example 19 | Material A | α-FeOOH | Carbon Monoxide | 350 | 30 | 20.6 | 8.9 | 6.2 | 0.046 | 6.2 |
| Example 20 | Material A | α-FeOOH | Acetylene | 350 | 30 | 20.4 | 8.8 | 6.1 | 0.044 | 6.0 |
| Comp. Example 1 | Material A | α-Fe₂O₃ | Nitrogen | 350 | 30 | 20.2 | 8.8 | 5.8 | 0.043 | 5.8 |
| Comp. Example 2 | Material B | α-Fe₂O₃ | Nitrogen | 350 | 30 | 15.3 | 9.5 | 6.4 | 0.038 | 4.9 |
| Comp. Example 3 | Material C | α-Fe₂O₃ | Nitrogen | 350 | 30 | 20.6 | 9.0 | 6.0 | 0.034 | 3.7 |
| Comp. Example 4 | Material D | α-Fe₂O₃ | Nitrogen | 350 | 30 | 30.1 | 8.6 | 4.8 | 0.055 | 7.3 |
| Comp. Example 5 | Material A | α-Fe₂O₃ | — | — | — | 20.3 | 8.6 | 6.2 | 0.047 | 8.2 |
| Comp. Example 6 | Material B | α-Fe₂O₃ | — | — | — | 15.1 | 9.7 | 6.3 | 0.036 | 4.9 |
| Comp. Example 7 | Material C | α-Fe₂O₃ | — | — | — | 20.9 | 9.2 | 5.8 | 0.032 | 3.5 |
| Comp. Example 8 | Material D | α-Fe₂O₃ | — | — | — | 30.3 | 8.5 | 4.9 | 0.057 | 7.1 |
| Comp. Example 9 | Material A | α-Fe₂O₃ | Nitrogen | 150 | 30 | 20.5 | 8.7 | 5.9 | 0.045 | 6.2 |
| Comp. Example 10 | Material A | α-Fe₂O₃ | Nitrogen | 300 | 30 | 20.3 | 9.7 | 6.2 | 0.048 | 6.3 |
| Comp. Example 11 | Material A | α-Fe₂O₃ | Nitrogen | 450 | 30 | 20.4 | 9.2 | 6.0 | 0.046 | 6.4 |
| Comp. Example 12 | Material A | α-Fe₂O₃ | Nitrogen | 600 | 30 | 20.6 | 8.5 | 6.3 | 0.047 | 6.3 |
| Comp. Example 13 | Material A | α-FeOOH | Nitrogen | 150 | 30 | 20.4 | 8.8 | 6.2 | 0.048 | 6.2 |
| Comp. Example 14 | Material A | α-FeOOH | Nitrogen | 300 | 30 | 20.6 | 9.5 | 6.5 | 0.044 | 6.0 |
| Comp. Example 15 | Material A | α-FeOOH | Nitrogen | 450 | 30 | 20.5 | 9.0 | 6.4 | 0.042 | 5.9 |
| Comp. Example 16 | Material A | α-FeOOH | Nitrogen | 600 | 30 | 20.8 | 8.7 | 6.3 | 0.046 | 6.2 |
| Comp. Example 17 | Material A | α-FeOOH | Nitrogen | 200 | 30 | 20.4 | 8.6 | 6.2 | 0.048 | 5.8 |
| Comp. Example 18 | Material A | α-FeOOH | Nitrogen | 200 | 60 | 20.6 | 8.8 | 6.1 | 0.041 | 6.4 |
| Comp. Example 19 | Material A | α-FeOOH | Nitrogen | 200 | 90 | 20.7 | 8.7 | 6.0 | 0.046 | 6.1 |
| Comp. Example 20 | Material A | α-FeOOH | Nitrogen | 200 | 120 | 20.5 | 8.6 | 5.9 | 0.043 | 5.8 |
| Comp. Example 21 | Material A | α-Fe₂O₃ | Nitrogen | 200 | 30 | 20.3 | 8.4 | 6.3 | 0.046 | 5.8 |
| Comp. Example 22 | Material A | α-Fe₂O₃ | Nitrogen | 200 | 60 | 20.4 | 8.5 | 6.0 | 0.044 | 6.2 |
| Comp. Example 23 | Material A | α-Fe₂O₃ | Nitrogen | 200 | 90 | 20.3 | 8.5 | 6.1 | 0.047 | 6.5 |
| Comp. Example 24 | Material A | α-Fe₂O₃ | Nitrogen | 200 | 120 | 20.9 | 8.7 | 6.2 | 0.049 | 6.1 |

| | Ferromagnetic Powder Properties | | | | | | | | |
|---|---|---|---|---|---|---|---|---|---|
| | Powder Properties | | | | | | Properties of acicular crystal iron oxyhydroxide Medium Properties | | |
| | | | ESCA Max. | Magnetic Properties | | | | | |
| No. | BET (m²/g) | Dx (Å) | Pt. (eV) | Hc (kA/m) | Hc (Oe) | σs (Am²/kg) | Δσs (%) | Hc (kA/m) | Hc (Oe) | SFDx | ΔBm (%) |
|---|---|---|---|---|---|---|---|---|---|---|---|
| Example 1 | 70.8 | 121 | 531.0 | 177.7 | 2232 | 143.9 | 8.2 | 184.5 | 2317 | 0.43 | 2.4 |
| Example 2 | 79.3 | 117 | 531.3 | 162.3 | 2038 | 123.4 | 9.8 | 167.3 | 2101 | 0.67 | 2.8 |
| Example 3 | 80.4 | 107 | 531.9 | 143.2 | 1799 | 118.9 | 10.2 | 146.9 | 1845 | 0.53 | 3.2 |
| Example 4 | 73.4 | 126 | 528.9 | 194.7 | 2445 | 141.7 | 5.3 | 198.9 | 2498 | 0.42 | 1.7 |
| Example 5 | 71.4 | 123 | 529.2 | 179.2 | 2251 | 138.9 | 7.0 | 184.3 | 2315 | 0.42 | 1.8 |
| Example 6 | 80.4 | 105 | 527.3 | 170.3 | 2139 | 138.4 | 5.8 | 179.8 | 2258 | 0.32 | 1.9 |
| Example 7 | 82.4 | 98 | 525.4 | 120.3 | 1511 | 108.4 | 4.7 | 125.9 | 1581 | 0.78 | 2.4 |
| Example 8 | 72.3 | 104 | 526.9 | 158.4 | 1990 | 112.4 | 5.2 | 162.3 | 2038 | 0.56 | 2.5 |
| Example 9 | 71.4 | 122 | 531.5 | 178.4 | 2241 | 137.4 | 12.3 | 183.4 | 2304 | 0.47 | 4.4 |
| Example 10 | 72.4 | 121 | 528.3 | 179.5 | 2255 | 136.1 | 10.3 | 186.4 | 2341 | 0.48 | 3.2 |
| Example 11 | 74.2 | 124 | 531.4 | 178.9 | 2247 | 137.2 | 11.8 | 185.4 | 2329 | 0.43 | 4.0 |
| Example 12 | 70.8 | 123 | 532.0 | 180.4 | 2266 | 138.4 | 14.7 | 186.7 | 2345 | 0.42 | 4.5 |
| Example 13 | 71.3 | 124 | 531.8 | 182.3 | 2290 | 135.4 | 10.8 | 189.3 | 2378 | 0.40 | 7.6 |
| Example 14 | 70.9 | 122 | 529.4 | 190.2 | 2389 | 136.8 | 5.5 | 198.6 | 2494 | 0.42 | 1.6 |
| Example 15 | 71.5 | 120 | 530.2 | 189.4 | 2379 | 137.3 | 7.8 | 194.3 | 2440 | 0.41 | 2.4 |
| Example 16 | 71.7 | 118 | 527.2 | 191.4 | 2404 | 137.5 | 9.4 | 197.6 | 2482 | 0.44 | 6.4 |
| Example 17 | 68.4 | 129 | 526.2 | 152.7 | 1918 | 123.4 | 10.4 | 161.9 | 2033 | 0.46 | 6.4 |
| Example 18 | 69.2 | 134 | 531.3 | 151.8 | 1907 | 119.2 | 12.3 | 158.0 | 1984 | 0.49 | 7.4 |
| Example 19 | 67.2 | 124 | 529.4 | 153.4 | 1927 | 127.2 | 11.5 | 161.2 | 2025 | 0.43 | 7.9 |
| Example 20 | 69.4 | 135 | 531.8 | 152.9 | 1920 | 117.4 | 12.8 | 169.8 | 2133 | 0.45 | 7.6 |
| Comp. Example 1 | 75.3 | 118 | 532.5 | 174.1 | 2187 | 142.9 | 17.3 | 175.8 | 2208 | 0.48 | 8.9 |
| Comp. Example 2 | 78.9 | 116 | 534.5 | 145.9 | 1833 | 120.3 | 15.8 | 147.9 | 1858 | 0.63 | 8.4 |
| Comp. Example 3 | 79.6 | 108 | 534.8 | 129.8 | 1630 | 119.7 | 17.3 | 131.4 | 1650 | 0.68 | 9.3 |
| Comp. Example 4 | 74.8 | 129 | 533.7 | 189.0 | 2374 | 132.5 | 16.8 | 190.3 | 2390 | 0.48 | 8.1 |
| Comp. Example 5 | 74.9 | 114 | 535.8 | 164.4 | 2065 | 138.7 | 19.3 | 166.2 | 2087 | 0.50 | 8.7 |
| Comp. Example 6 | 76.2 | 116 | 535.4 | 145.8 | 1831 | 118.9 | 17.8 | 147.8 | 1856 | 0.47 | 6.2 |
| Comp. Example 7 | 79.1 | 107 | 536.1 | 129.4 | 1625 | 116.8 | 20.5 | 131.2 | 1648 | 0.53 | 10.3 |
| Comp. Example 8 | 75.3 | 121 | 535.2 | 187.9 | 2360 | 130.5 | 16.0 | 190.2 | 2389 | 0.52 | 6.9 |
| Comp. Example 9 | 80.2 | 116 | 532.9 | 167.2 | 2100 | 134.8 | 15.9 | 169.3 | 2126 | 0.53 | 6.1 |
| Comp. Example 10 | 81.4 | 117 | 532.1 | 168.9 | 2121 | 135.9 | 15.4 | 169.8 | 2133 | 0.55 | 5.8 |
| Comp. Example 11 | 79.6 | 114 | 532.7 | 167.4 | 2103 | 137.2 | 15.6 | 168.4 | 2115 | 0.57 | 6.0 |
| Comp. Example 12 | 78.3 | 119 | 533.8 | 163.2 | 2050 | 138.4 | 16.2 | 164.8 | 2070 | 0.56 | 7.3 |
| Comp. Example 13 | 74.4 | 121 | 535.6 | 169.2 | 2125 | 136.2 | 19.4 | 170.2 | 2138 | 0.62 | 9.8 |
| Comp. Example 14 | 76.3 | 124 | 533.4 | 170.5 | 2141 | 138.3 | 16.4 | 171.7 | 2157 | 0.59 | 7.2 |
| Comp. Example 15 | 77.4 | 126 | 534.8 | 168.3 | 2114 | 134.2 | 17.3 | 170.2 | 2138 | 0.65 | 7.4 |
| Comp. Example 16 | 76.9 | 127 | 535.4 | 165.9 | 2084 | 137.2 | 18.6 | 167.9 | 2109 | 0.67 | 8.1 |

TABLE 2-continued

| | | | | | | | | | | |
|---|---|---|---|---|---|---|---|---|---|---|
| Comp. Example 17 | 75.8 | 129 | 534.2 | 171.3 | 2152 | 137.4 | 17.8 | 172.8 | 2170 | 0.63 | 7.6 |
| Comp. Example 18 | 73.4 | 117 | 532.9 | 168.9 | 2121 | 138.3 | 15.8 | 170.1 | 2136 | 0.67 | 5.7 |
| Comp. Example 19 | 73.9 | 116 | 535.8 | 165.4 | 2077 | 136.2 | 18.4 | 167.5 | 2104 | 0.64 | 8.0 |
| Comp. Example 20 | 75.6 | 119 | 535.3 | 162.9 | 2046 | 138.3 | 23.2 | 164.1 | 2061 | 0.66 | 11.3 |
| Comp. Example 21 | 73.4 | 113 | 535.9 | 169.3 | 2126 | 136.9 | 17.4 | 170.2 | 2138 | 0.65 | 7.4 |
| Comp. Example 22 | 78.3 | 118 | 534.8 | 167.2 | 2100 | 137.2 | 15.9 | 169.5 | 2129 | 0.69 | 5.9 |
| Comp. Example 23 | 75.9 | 121 | 536.7 | 165.3 | 2076 | 135.2 | 17.8 | 167.9 | 2109 | 0.67 | 7.8 |
| Comp. Example 24 | 76.9 | 126 | 537.0 | 162.7 | 2044 | 132.9 | 20.3 | 164.9 | 2071 | 0.68 | 12.9 |

Examples 2 to 4

Magnetic powders were obtained by the same procedure as Example 1, except for the changes from Material A to Material B, C or D as the particles of the cake, the compositions and properties shown in Table 1. Table 2 shows the magnetic powder properties and the evaluation properties of tape using the powders.

The binding energy peak was 531.3 eV in the case of the powder of Example 2, 531.9 eV in the case of the powder of Example 3, and 528.9 eV in the case of the powder of Example 4. Also, as shown in Table 2, the powders of Examples 2 to 4 had a low $\Delta\sigma s$ of from 5.3 to 10.2%, and the tape using the powders also had a low $\Delta Bm$ of from 1.7 to 3.2%. Thus, the powders and tape using the powders had good oxidation resistance.

Examples 5 to 8

The magnetic powders of Examples 5 to 8 were obtained by the same procedure as Examples 1 to 4, except that they were not transformed to α-iron oxide but reduced directly from iron oxyhydroxide state. Table 2 shows the magnetic powder properties and the evaluation properties of tape using the powders. The powder of Example 5 had a binding energy peak of 529.2 eV, that of the powder of Example 6 was 527.3 eV, that of the powder of Example 7 was 525.4 eV, and that of the powder of Example 8 was 526.9 eV. Also, as shown in Table 2, the powders of Examples 5 to 8 had a low $\Delta\sigma s$ of from 4.7 to 7.0%, and the tape using the powders also had a low $\Delta Bm$ of from 1.8 to 2.5%. Thus, the powders and tape using the powders had good oxidation resistance.

Examples 9 to 12

The magnetic powders of Examples 9 to 12 were obtained by the same procedure as Example 1, except for the changes to the annealing treatment temperatures shown in Table 2. The magnetic powder properties and the evaluation properties of tape using the powders are shown in Table 2. The powder of Example 9 had a binding energy peak of 531.5 eV, that of the powder of Example 10 was 528.3 eV, that of the powder of Example 11 was 531.4 eV, and that of the powder of Example 12 was 532.0 eV. Also, as shown in Table 2, the powders of Examples 9 to 12 had a somewhat low $\Delta\sigma s$ of from 10.3 to 14.7%, and the tape using the powders also had a somewhat low $\Delta Bm$ of from 3.2 to 4.5%. Thus, the powders and tape using the powders had good oxidation resistance.

Examples 13 to 16

The magnetic powders of Examples 13 to 16 were obtained by the same procedure as Example 1, except for the changes to the annealing treatment times shown in Table 2. The magnetic powder properties and the evaluation properties of tape using the powders are shown in Table 2. The powder of Example 13 had a binding energy peak of 531.8 eV, that of the powder of Example 14 was 529.4 eV, that of the powder of Example 15 was 530.2 eV, and that of the powder of Example 16 was 527.2 eV. Also, as shown in Table 2, the powders of Examples 13 to 16 had a somewhat low $\Delta\sigma S$ of from 5.5 to 10.8%, and the tape using the powders also had a somewhat low $\Delta Bm$ of from 1.6 to 7.6%. Thus, the powders and tape using the powders had good oxidation resistance.

Example 17

The magnetic powder of Example 17 was obtained by the same procedure as Example 1, except that the active gas used for the annealing treatment was changed to carbon monoxide. The magnetic powder properties and the evaluation properties of tape using the powder are shown in Table 2. This powder had a binding energy peak of 526.2 eV and a somewhat low $\Delta\sigma s$ of 10.4; tape using the powder also had a somewhat low $\Delta Bm$ of 6.4%. Thus, the powder and tape using the powder had good oxidation resistance.

Example 18

The magnetic powder of Example 18 was obtained by the same procedure as Example 1, except that the active gas used for the annealing treatment was changed to acetylene. The magnetic powder properties and the evaluation properties of tape using the powder are shown in Table 2. This powder had a binding energy peak of 531.3 eV and a somewhat low $\Delta\sigma s$ of 12.3; tape using the powder also had a somewhat low $\Delta Bm$ of 7.4%. Thus, the powder and tape using the powder had good oxidation resistance.

Example 19

The magnetic powder of Example 19 was obtained by the same procedure as Example 5, except that the active gas used for the annealing treatment was changed to carbon monoxide. The magnetic powder properties and the evaluation properties of tape using the powder are shown in Table 2. This powder had a binding energy peak of 529.4 eV and a somewhat low $\Delta\sigma s$ of 11.5; tape using the powder also had a somewhat low $\Delta Bm$ of 7.9%. Thus, the powder and tape using the powder had good oxidation resistance.

Example 20

The magnetic powder of Example 20 was obtained by the same procedure as Example 5, except that the active gas used for the annealing treatment was changed to acetylene. The magnetic powder properties and the evaluation properties of tape using the powder are shown in Table 2. This powder had a binding energy peak of 531.8 eV and a somewhat low $\Delta\sigma s$ of 12.8; tape using the powder also had a somewhat low $\Delta Bm$ of 7.6%. Thus, the powder and tape using the powder had good oxidation resistance.

Comparative Example 1

The magnetic powder of Comparative Example 1 was obtained by the same procedure as Example 1, except that the annealing treatment was carried out for 30 minutes at 350° C. in nitrogen. The magnetic powder properties and the evaluation properties of tape using the powder are shown in Table 2 as Comp. Example 1 and the binding energy peak of the powder is shown in FIG. 1. This powder had a binding energy peak of 532.5 eV and a high $\Delta\sigma s$ of 17.3; tape using the powder also had a high $\Delta Bm$ of 8.9%. Thus, the powder and tape using the powder had inferior oxidation resistance.

Comparative Examples 2 to 4

The magnetic powders of Comparative Examples 2 to 4 were obtained by the same procedure as Comparative Example 1, except for the changes from Material A to Material B, C or D as the particles of the cake, the compositions and properties shown in Table 1. Table 2 shows the magnetic powder properties and the evaluation properties of tape using the powders. The powder of Comparative Example 2 had a binding energy peak of 534.5 eV, that of the powder of Comparative Example 3 was 534.8 eV, and that of the powder of Comparative Example 4 was 533.7 eV. Also, as shown in Table 2, the powders of Comparative Examples 2 to 4 had a high $\Delta\sigma s$ of from 15.8 to 17.3%, and the tape using the powders also had a high $\Delta Bm$ of from 8.1 to 9.3%. Thus, the powders and tape using the powders had inferior oxidation resistance.

Comparative Examples 5 to 8

The magnetic powders of Comparative Examples 5 to 8 were obtained by the same procedure as Examples 1 to 4, except for the omission of the annealing step onwards. Table 2 shows the magnetic powder properties and the evaluation properties of tape using the powders. The powder of Comparative Example 5 had a binding energy peak of 535.8 eV, that of the powder of Comparative Example 6 was 535.4 eV, that of the powder of Comparative Example 7 was 536.1 eV, and that of Comparative Example 8 was 535.2 eV. The $\Delta\sigma s$ of Comparative Example 5 was a high 19.3%, and was also a high 16.0 to 20.5% in the case of Comparative Examples 6 to 8. The $\Delta Bm$ of tape using the powders was also high: 8.7% in the case of Comparative Example 5, and from 6.2 to 10.3% in the case of Comparative Examples 6 to 8. Thus, the powders and tape using the powders had inferior oxidation resistance.

Comparative Examples 9 to 12

The magnetic powders of Comparative Examples 9 to 12 were obtained by the same procedure as Comparative Example 1, except for the changes to the annealing treatment temperatures shown in Table 2. Table 2 shows the magnetic powder properties and the evaluation properties of tape using the powders. The powder of Comparative Example 9 had a binding energy peak of 532.9 eV, that of the powder of Comparative Example 10 was 532.1 eV, that of the powder of Comparative Example 11 was 532.7 eV, and that of Comparative Example 12 was 533.8 eV. Each of the powders exhibited a high $\Delta\sigma s$: 15.9% in the case of Comparative Example 9, and from 15.4 to 16.2% in the case of Comparative Examples 10 to 12. The $\Delta Bm$ of tape using the powders was also high: 6.1% in the case of Comparative Example 9, and from 5.8 to 7.3% in the case of Comparative Examples 10 to 12. Thus, the powders and tape using the powders had rather inferior oxidation resistance.

Comparative Examples 13 to 16

The magnetic powders of Comparative Examples 13 to 16 were obtained by the same procedure as Comparative Example 1, except that the iron oxyhydroxide was directly reduced without undergoing conversion (calcination) to $\alpha$-iron oxide, which was followed by stabilization treatment, and the following annealing treatment in nitrogen was carried out at the temperatures shown in Table 2. Table 2 shows the magnetic powder properties and the evaluation properties of tape using the powders. The powder of Comparative Example 13 had a binding energy peak of 535.6 eV, that of the powder of Comparative Example 14 was 533.4 eV, that of the powder of Comparative Example 15 was 534.8 eV, and that of Comparative Example 16 was 535.4 eV. Each of the powders exhibited a high $\Delta\sigma s$: 19.4% in the case of Comparative Example 13, and from 16.4 to 18.6% in the case of Comparative Examples 14 to 16. The $\Delta Bm$ of tape using the powders was also high: 9.8% in the case of Comparative Example 13, and from 7.2 to 8.1% in the case of Comparative Examples 14 to 16. Thus, the powders and tape using the powders had inferior oxidation resistance.

Comparative Examples 17 to 20

The magnetic powders of Comparative Examples 17 to 20 were obtained by the same procedure as Comparative Example 1, except that the iron oxyhydroxide was directly reduced without undergoing conversion (calcination) to $\alpha$-iron oxide, which was followed by stabilization treatment, and the following annealing treatment in nitrogen was carried out at the temperatures and duration times shown in Table 2. Table 2 shows the magnetic powder properties and the evaluation properties of tape using the powders. The powder of Comparative Example 17 had a binding energy peak of 534.2 eV, that of the powder of Comparative Example 18 was 532.9 eV, that of the powder of Comparative Example 19 was 535.8 eV, and that of Comparative Example 20 was 535.3 eV. Each of the powders exhibited a high $\Delta\sigma s$: 17.8% in the case of Comparative Example 17, and from 15.8 to 23.2% in the case of Comparative Examples 18 to 20. The $\Delta Bm$ of tape using the powders was also high: 7.6% in the case of Comparative Example 17, and from 5.7 to 11.3% in the case of Comparative Examples 18 to 20. Thus, the powders and tape using the powders had inferior oxidation resistance.

Comparative Examples 21 to 24

The magnetic powders of Comparative Examples 21 to 24 were obtained by the same procedure as Comparative Example 1, except the annealing treatment in nitrogen was carried out at the temperatures and duration times shown in Table 2. Table 2 shows the magnetic powder properties and the evaluation properties of tape using the powders. The powder of Comparative Example 21 had a binding energy peak of 539.9 eV, that of the powder of Comparative Example 22 was 534.8 eV, that of the powder of Comparative Example 23 was 536.7 eV, and that of Comparative Example 24 was 537.0 eV. Each of the powders exhibited a high $\Delta\sigma s$: 17.4% in the case of Comparative Example 21, and from 15.9 to 20.3% in the case of Comparative Examples 22 to 24. The $\Delta Bm$ of tape using the powders was also high: 7.4% in the case of Comparative Example 21, and from 5.9 to 12.9% in the case of Comparative Examples 22 to 24. Thus, the powders and tape using the powders had inferior oxidation resistance.

FIG. 1 shows a clear difference between the binding energy peaks of Example 1 and Comparative Example 1, indicating some change in the form of the oxide film. At the same time, there is a marked improvement in the Δσs indicating the oxidation resistance.

With respect to the group consisting of Example 2, Comparative Example 2 and Comparative Example 3, the group consisting of Example 3, Comparative Example 3 and Comparative Example 7, and the group consisting of Example 4, Comparative Example 4 and Comparative Example 8, the members within each group use the same particle nucleus, which makes it possible to investigate whether the effect of this invention is lost or not depending on the cobalt content of the particles. The results show that in each case, the oxidation resistance is improved by using the means of the present invention.

Comparing Examples 1 to 4 with Examples 5 to 8 makes it possible to ascertain the difference between when calcination is implemented and not implemented; that is, the differences arising from the state of the particles when reduction is initiated. Based on this, it was found that when the means of this invention is applied, using iron oxyhydroxide as the material at the start of the reduction provides a greater improvement in properties than the use of hematite.

Comparing the results obtained in the case of Example 1 with those obtained from Examples 13 to 16, it is possible to ascertain the differences in properties and oxidation resistance that are based on the duration of the annealing treatment in a reducing atmosphere. This shows that a longer treatment time is not necessarily more effective, but rather that properties can be improved more effectively by setting a suitable duration time for the annealing treatment.

The effect of the reducing gas used can be confirmed by comparing Example 1 with Examples 17 and 18. This comparison shows that different reducing gases give rise to differences in the properties of the magnetic powder, and that hydrogen is the most suitable reducing gas.

What is a suitable temperature for the reduction in the annealing treatment carried out in a reducing atmosphere can be investigated by a comparison of Example 1 with Examples 9 to 12. The result shows that a slightly low temperature is preferable, with a temperature between 300 and 400° C. being particularly good.

Comparative Examples 9 to 24 show how the properties of the magnetic powder are changed by the annealing conditions used in the case of annealing treatment carried out in nitrogen. Specifically, in Comparative Examples 9 to 12 having α-iron oxide as the starting material and Comparative Examples 13 to 16 having iron oxyhydroxide as the starting material, the annealing temperature is varied while using the same annealing duration, and then, in Comparative Examples 17 to 20 having iron oxyhydroxide as the starting material and Comparative Examples 21 to 24 having α-iron oxide as the starting material, the annealing duration is varied while using the same annealing treatment temperature, which reveals the effect that doing this has on the magnetic powder properties. Comparing these with Example 1 shows that in the case of the annealing process, it is preferable to effect a weaker reduction with a hydrogen atmosphere rather than with nitrogen, which is an inert gas.

The Examples also show that it was discovered that by re-introducing hydrogen into the system after the normal reduction and oxidation stabilization treatment and again subjecting the magnetic powder to annealing treatment, it was possible to obtain magnetic powder having the features described herein measured by ESCA, and that the magnetic powder had good oxidation resistance. Also, it makes it possible to obtain magnetic powder having properties that are superior to those of magnetic powder obtained by a conventional method. The invention can be applied to magnetic recording media for which there is a demand for higher capacities, densities and image quality, such as tape used in home audio-visual equipment and storage tape for data backup applications.

What is claimed is:

1. A ferromagnetic metal powder of acicular particles comprised primarily of iron for a magnetic recording medium, wherein the acicular particles have a long axis length of not more than 80 nm and the surface of the acicular particles has an iron system oxide, characterized in that the powder has an ESCA-measured binding energy peak of from 525 to 532 electron volts (eV) at the point oxygen O(1s) appeared and exhibits a saturation magnetization percentage decrease Δσs of less than 15%, herein, alter being stored for one week at a constant temperature of 60° C. and a constant relative humidity of 90%, taking σs(i) as the saturation magnetization prior to being stored at a constant temperature and constant humidity and σs(ii) as the saturation magnetization after said one week, Δσs=100 ×((σs(i)−σs(ii))/σs(i).

2. A ferromagnetic metal powder according to claim 1, wherein the acicular particles have a long axis length of not more than 60 nm.

3. A ferromagnetic metal powder according to claim 1, wherein the magnetic powder has a Co content in terms of Co/Fe atomic percentage ratio of not more than 50%.

4. A ferromagnetic metal powder for a magnetic recording medium according to claim 1, obtained by subjecting metallic iron powder obtained by reduction to oxidation treatment, reducing the surface of the magnetic powder particles in a reducing gas, and subjecting the magnetic powder particles to another oxidation treatment.

5. A method of producing ferromagnetic metal powder of claim 1 for a magnetic recording medium, comprising subjecting metallic iron powder obtained by reduction of iron oxyhydroxide or α-iron oxide to oxidation treatment, reducing the surface of the oxidized powder particles in a reducing gas, and subjecting the magnetic powder particles to another oxidation treatment.

6. A magnetic recording medium in which a magnetic layer is constituted by a magnetic powder according to claim 1.

* * * * *